June 15, 1965     J. G. WILLIS, JR., ET AL     3,189,077
RETAINING CLIP FOR HEADED FASTENERS
Filed Aug. 7, 1962
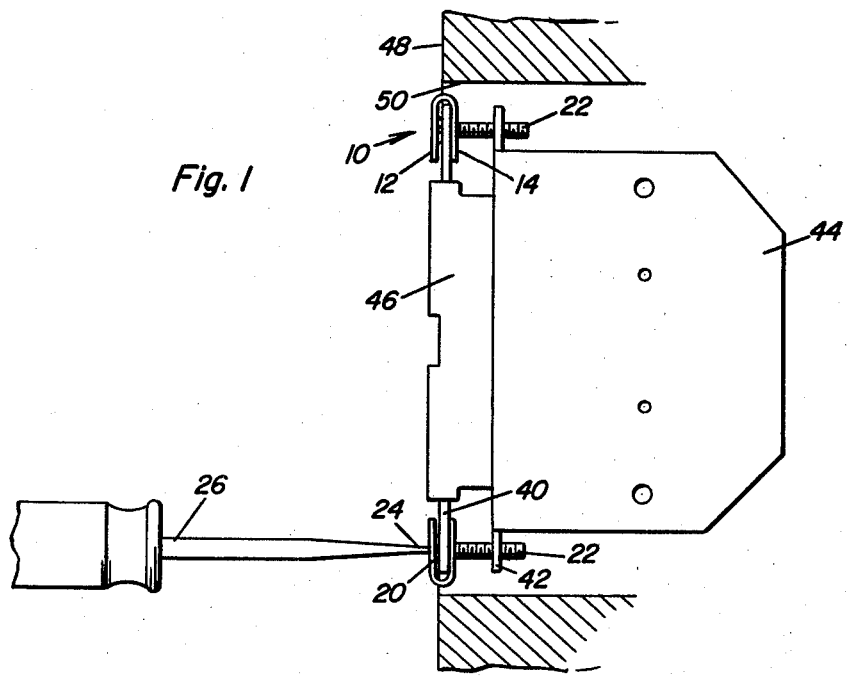
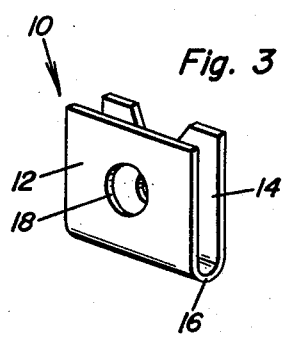
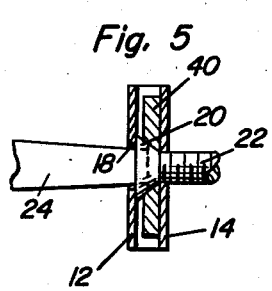
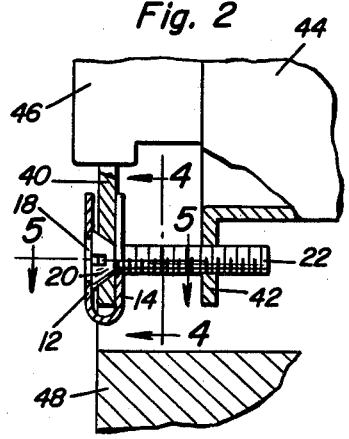
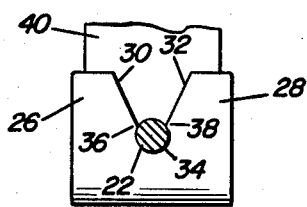
Julian G. Willis, Jr.
Stephen E. Howard
         INVENTORS.

United States Patent Office 3,189,077
Patented June 15, 1965

3,189,077
RETAINING CLIP FOR HEADED FASTENERS
Julian G. Willis, Jr., 3821 NW. 4th Ave., Pompano Beach, Fla., and Stephen E. Howard, 320 NW. 22nd St., Boca Raton, Fla.
Filed Aug. 7, 1962, Ser. No. 215,395
1 Claim. (Cl. 151—69)

The present invention generally relates to electrical devices such as wall outlets and switches, and more particularly relates to a means for insuring a flush mounting of such devices regardless of the orientation of the wall box or the size of the opening through the wall.

Normally, a wall mounted electrical device is held in place by two screws which extend through holes provided at the two ends of the device support bar, these screws being threadedly received within holes in the wall box. The devices, whether they be outlets or switches, are maintained in position by being screwed tightly against the wall box, or, if the wall box has been set back too far from the finished wall, the outer end of the device support bar can be brought into engagement with the finished wall and retained in position by the above-mentioned screws threaded into the holes of the recessed wall box. However, the situation frequently arises wherein the wall box has been recessed too far and the wall opening has been made of a size so large as to prevent contact of the device support bar therewith thus requiring the use of various types of spacers or washers positioned between the wall box and the device so as to provide the desired stable base resulting in a flush mounting of the switch or outlet. As will be appreciated, the necessity, in each instance, of finding a spacer of just the right thickness so as to properly orientate the device so as to be positioned flush with the finished wall can be both a troublesome and time consuming job. Accordingly, one of the primary objects of the present invention resides in the provision of a means for quickly insuring the proper positoning of the electrical device regardless of the recessed positioning of the wall box or the size of the wall opening, such means being effective so as to accommodate any positioning of the electrical device relative to the wall box within the limits of the attaching screws.

In conjunction with the above object, another object of the present invention resides in the provision of a clip capable of fixing the position of the electrical device relative to the attaching screws, the forward ends of the screws being threadedly fixed relative to the wall box, thus preventing longitudinal movement of the electrical device relative to the box without the necessity of requiring the use of spacers.

Also, an object of the present invention is to provide a means for fixing the electrical device relative to the attaching screws in a manner so as to allow for the subsequent threading of the screws into the wall box for the adjustment of the device relative thereto.

Likewise, an object of the present invention resides in the provision of a clip which is simple in structure, inexpensive to manufacture and highly effective for its intended purpose.

Further, an object of the present invention resides in the provision of a clip which can be quickly attached and easily removed.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 illustrates a side elevational view of a wall receptacle secured within a wall box by means of the present invention;

FIGURE 2 is an enlarged view of the lower end of FIGURE 1 with portions broken away for purposes of illustration;

FIGURE 3 is a perspective view of the clip comprising the present invention;

FIGURE 4 is a cross-sectional view taken substantially on a plane passing along line 4—4 in FIGURE 2; and FIGURE 5 is a cross-sectional view taken substantially on a plane passing along line 5—5 in FIGURE 2.

Referring now more particularly to the drawings, reference numeral 10 generally designates the clip comprising the present invention. This clip 10 is generally U-shaped in form and consists of two parallelly extending legs 12 and 14 integrally connected by a bight portion 16. The first leg 12 is formed with an aperture 18 therethrough with the aperture being of a size slightly smaller than the head 20 of a standard attaching screw 22 while at the same time allowing for the passage of the tip 24 of a screwdriver 26 therethrough so as to enable the rotation of the screw 22 when the clip 10 is applied.

The leg 14 of the clip 10 is bifurcated with the two furcations 26 and 28 having inwardly converging edges 30 and 32, the inner ends of which communicate with an enlarged circular aperture 34 with a restricted opening being formed by the two shoulders 36 and 38. This opening 34 is of a size so as to rotatably receive the shank of the screw 22 therein with the furcations 26 and 28 being slightly outwardly sprung so as to pass the screw 22 by the shoulders 36 and 38 which consequently act as a retaining means.

As will be best appreciated from FIGURES 1, 2 and 5, the clip 10 is intended to receive an extending tab of the support bar 40 which is conventionally provided with an aperture therethrough for the reception of the screw 22. In applying the clip, the screw 22 is first inserted through the support bar aperture and then the leg 12 is positioned on the ouside of the support bar 40 and the leg 14 is positioned on the inside of the bar 40 with the clip 10 being snapped into position so as to orientate the aperture 18 in line with the screwhead 20 with the screw 22 being received within the opening 34 of the leg 14. After positioning the clip in such a manner, a screwdriver 26 is used to thread the screws 22 into the threaded apertures normally provided on transverse lugs 42 on conventional wall boxes 44 thus enabling the orientation of the electrical device 46 flush with the wall surface 48 regardless of either the size of the wall opening 50 or the distance that the wall box 44 is recessed, the only limitation being the length of the screws 22.

While the preferred manner of using the clip has been set forth supra, it is also considered to be apparent that this clip can be applied in retaining relation to the screwhead after the screw has been driven to the desired depth.

From the foregoing, it is considered to be apparent that a novel clip has been defined which enables the flush mounting of wall outlets and switches relative to improperly positioned wall boxes without the necessity of going through the troublesome and time consuming process of finding a spacer of the correct size and then attempting to properly orientate the spacer between the electrical device and the wall box. This difficulty is avoided by the provision of a novel clip which can be quickly snapped in position so as to maintain the head of the attaching screw in longitudinally fixed position relative to the electrical device while at the same time allowing for the rotation of the screw so as to effect its threaded reception within the threaded aperture normally provided in the conventional wall boxes, thus resulting in the headed end of the screw being longitudinally fixed relative to the electrical device and the threaded end of the screw being longitudinally stabilized relative to the wall box so as to present a properly orientated flush mounting.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In combination, a plate, a screw, and a clip, said plate having an aperture therethrough, said screw having a head on one end thereof, said screw being received through said aperture with the head rotatably engaged against one face of the plate, said clip consisting solely of two generally parallel planar legs interconnected at one end, said legs receiving both the screw head and plate therebetween with one leg being engaged against a planar face of the screw head so as to rotatably maintain the screw head against the plate and with the other leg engaged against the second face of the plate, said one leg having a hole therein aligned with the screw head and of a diameter less than that of the screw head, said other leg having an opening therein freely receiving said screw therethrough, said screw head having a tool receiving recess therein accessible through said one leg hole for effecting a rotation of said screw, said other leg including a notch therein extending inwardly from the free end thereof into communication with the opening, the sides of said notch converging inwardly toward said opening and intersecting said opening at points spaced apart less than the diameter of the opening and less than the cross-sectional diameter of the screw.

References Cited by the Examiner
UNITED STATES PATENTS

| | | | |
|---|---|---|---|
| 989,854 | 4/11 | Kruse | 220—3.4 |
| 1,069,425 | 8/13 | Hornbeck | 220—3.4 |
| 1,392,561 | 10/21 | Duffy | 85—5.5 |
| 1,933,724 | 11/33 | Fox | 85—5.5 |
| 2,018,346 | 10/35 | Busby | 151—69 |
| 2,159,573 | 5/39 | Tinnerman | 151—41.75 |
| 2,185,553 | 1/40 | Hill | 151—69 |
| 2,590,450 | 3/52 | Parsons | 151—41.75 |
| 2,748,906 | 6/56 | Flora | 151—41.75 |
| 2,978,079 | 4/61 | Lowell | 189—88 |

EDWARD C. ALLEN, *Primary Examiner.*